United States Patent
Usgaard et al.

[11] Patent Number: 5,855,670
[45] Date of Patent: Jan. 5, 1999

[54] LIQUID DISTRIBUTION APPARATUS FOR A DOUGH PROCESSING LINE

[75] Inventors: Dennis B. Usgaard, New Hope; John A. Peterson, Shoreview; Joseph G. Anton, Brooklyn Park, all of Minn.

[73] Assignee: The Pillsbury Company, Minneapolis, Minn.

[21] Appl. No.: 720,023

[22] Filed: Sep. 27, 1996

[51] Int. Cl.⁶ ................................................. A21C 9/00
[52] U.S. Cl. .............................. 118/13; 118/24; 118/315; 118/324; 426/302
[58] Field of Search ............................... 118/13, 24, 315, 118/324, DIG. 4, DIG. 8; 426/302; 222/318, 330; 427/286, 420, 428

[56] References Cited

U.S. PATENT DOCUMENTS

| | | |
|---|---|---|
| 910,812 | 1/1909 | Harton . |
| 943,284 | 12/1909 | Tietjens . |
| 1,417,086 | 5/1922 | Massarella . |
| 1,771,117 | 7/1930 | Greer . |
| 1,859,971 | 5/1932 | Keck . |
| 2,260,686 | 10/1941 | Segrin .................................. 107/1 |
| 3,185,129 | 5/1965 | Sollich ................................. 118/4 |
| 3,307,517 | 3/1967 | Rasmusson et al. ................ 118/421 |
| 3,345,972 | 10/1967 | Masulis ............................... 118/301 |
| 3,359,941 | 12/1967 | Sible ................................... 118/301 |
| 3,383,054 | 5/1968 | Nugarus .............................. 239/597 |
| 3,434,457 | 3/1969 | Bass ..................................... 118/301 |
| 3,536,034 | 10/1970 | Lecrone .............................. 118/16 |
| 3,610,201 | 10/1971 | Meyer ................................. 118/24 |
| 3,632,356 | 1/1972 | Silverstein et al. ................. 99/134 |
| 3,648,625 | 3/1972 | Glass .................................. 425/93 |
| 3,839,987 | 10/1974 | Bruschke et al. .................. 118/6 |
| 3,839,989 | 10/1974 | Niderer .............................. 118/13 |
| 3,919,969 | 11/1975 | Leverett ............................. 118/13 |
| 4,032,667 | 6/1977 | Kreuter .............................. 426/306 |
| 4,368,684 | 1/1983 | Launay .............................. 118/25 |
| 4,456,446 | 6/1984 | Konig ................................. 425/102 |
| 4,473,027 | 9/1984 | Arfert et al. ....................... 118/304 |
| 4,548,158 | 10/1985 | Sollich .............................. 118/24 |
| 4,942,842 | 7/1990 | Siegenthaler et al. ............. 118/24 |
| 5,186,098 | 2/1993 | Miller ................................ 99/494 |
| 5,209,779 | 5/1993 | Talerico ............................ 118/24 |
| 5,654,040 | 8/1997 | Matsunaga ....................... 118/DIG. 4 |

FOREIGN PATENT DOCUMENTS 303 750 C  2/1918  Germany .

OTHER PUBLICATIONS

Spray — Bulletin No. 163B, "101 Typical Spray Nozzle Applications", *Spraying Systems Co.* (1995).

*Primary Examiner*—Laura Edwards
*Attorney, Agent, or Firm*—Westman, Champlin & Kelly, P.A.; S. Koehler

[57] ABSTRACT

A liquid distribution apparatus for distributing liquid to a dough product includes a source of liquid and an enclosure fluidly coupled to the source of liquid for receiving liquid. The enclosure includes a plurality of spaced-apart holes through which the liquid exits the enclosure. Preferably, a plurality of guide structures on the enclosure guide the liquid to a bottom surface of the enclosure whereat the liquid drops to the dough product. In a further embodiment, a plurality of guiding elements receives the liquid from the plurality of spaced-apart holes and guides the liquid to the dough product. Each guiding element includes a first end disposed proximate the enclosure to receive liquid from one of the plurality of spaced-apart holes and a second end remote from each corresponding first end.

15 Claims, 5 Drawing Sheets

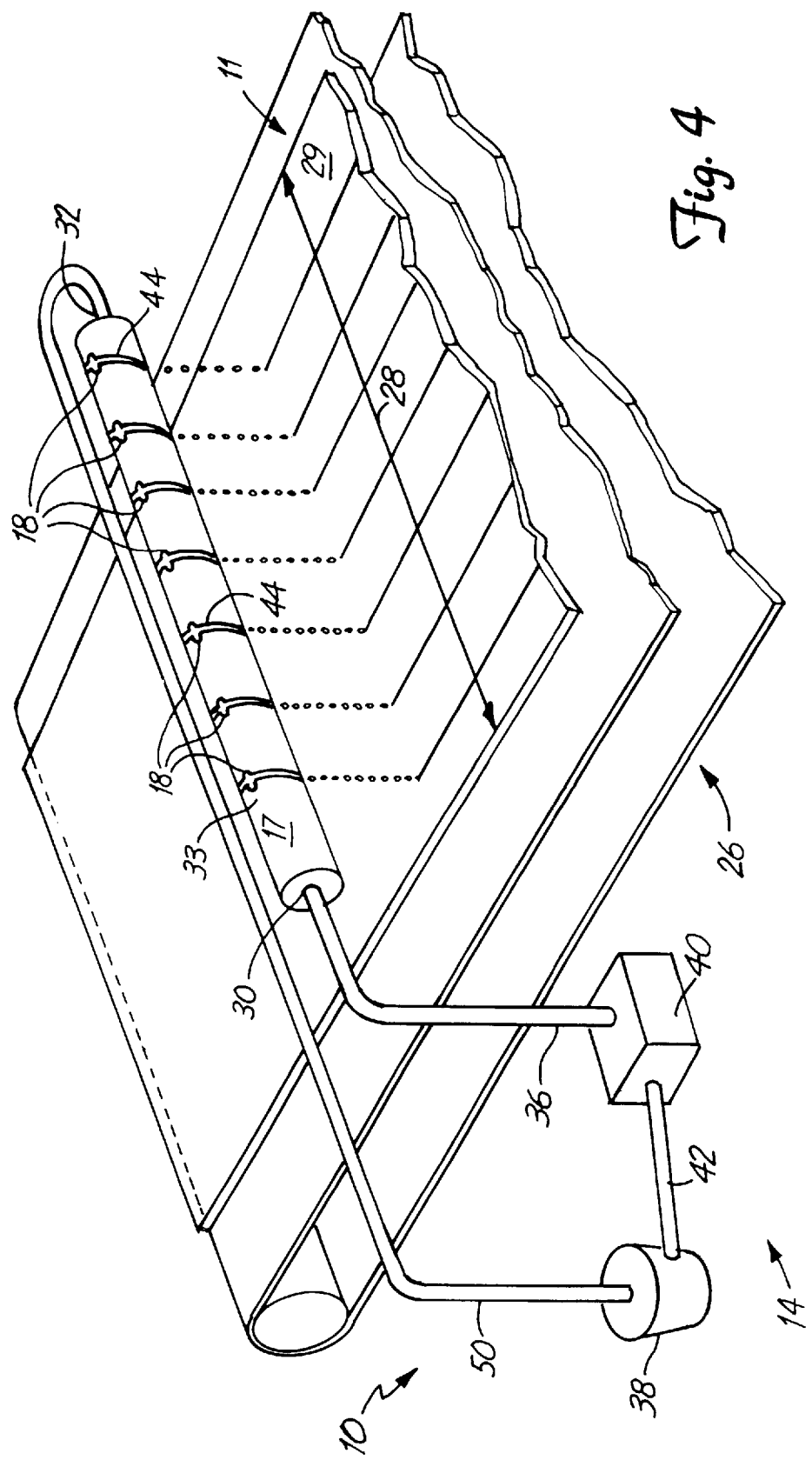

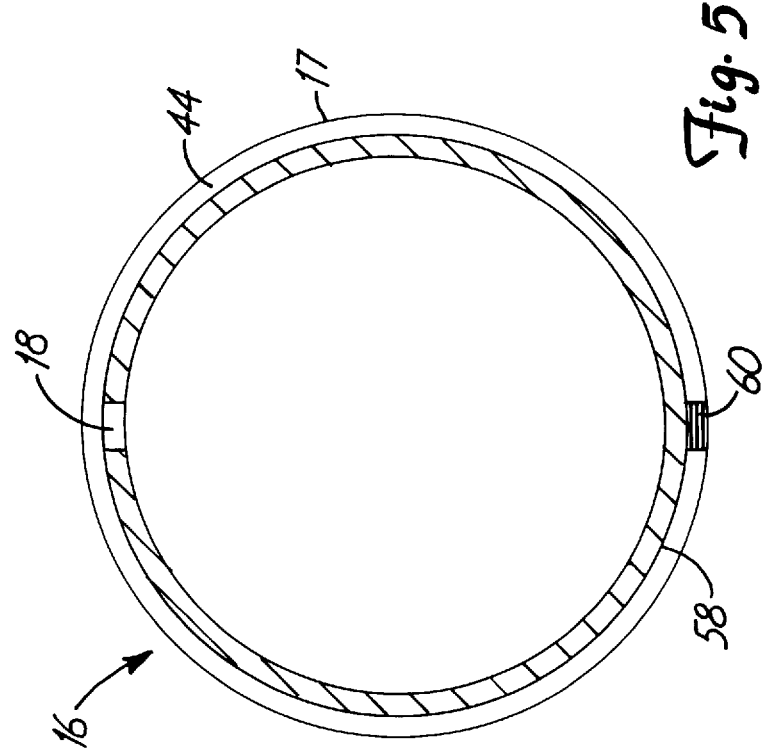

LIQUID DISTRIBUTION APPARATUS FOR A DOUGH PROCESSING LINE

BACKGROUND OF THE INVENTION

The present invention relates to dough processing lines. More particularly, the present invention relates to an apparatus for distributing a liquid onto a dough product as it moves along a conveyor line.

It is often desirable to apply a liquid to a dough product as it travels along a conveyor line. For example, when producing a laminated dough product, it is necessary to provide layers of oil in the dough. In another application, a layer of oil is applied to individual dough pieces prior to stacking upon each other. The layer of oil permits easy separation of the pieces from each other at a later time.

Typically, the oil is applied to the top surface of the sheet of dough or dough pieces using sprayers. Spraying permits uniform distribution of the oil on the top surface of the dough, but this technique requires periodic cleaning of the spraying apparatus and surrounding environment adjacent the sprayer due to the fine mist of oil dispersed from the sprayers. The problem is compounded if the dough has a layer of flour on its surface prior to application of the oil since the force of the oil as it is sprayed also results in flour being dispersed from the dough surface. The dispersed flour and oil quickly coat components of the conveyor line. These components must be frequently cleaned, during which the conveyor and product line are shut down.

The present invention relates to an apparatus for dispensing liquid on a dough processing line that avoids the problems associated with spraying or atomizing the liquid. Another approach for solving this problem is disclosed in co-pending application entitled "SYSTEM FOR APPLYING FLUID STRIP TO DOUGH" filed on even date herewith having Ser. No. 08/720027.

SUMMARY OF THE INVENTION

A liquid distribution apparatus for distributing liquid to a dough product includes a source of liquid and an enclosure fluidly coupled to the source of liquid for receiving liquid. The enclosure includes a plurality of spaced-apart holes through which the liquid exits the enclosure. Preferably, a plurality of guide structures on the enclosure guide the liquid to a bottom surface of the enclosure whereat the liquid drops to the dough product. In a further embodiment, a plurality of guiding elements receives the liquid from the plurality of spaced-apart holes and guides the liquid to the dough product. Each guiding element includes a first end disposed proximate the enclosure to receive liquid from one of the plurality of spaced-apart holes and a second end remote from each corresponding first end.

BRIEF DESCRIPTION OF THE DRAWINGS

FIG. 4 is a perspective view of a third embodiment of a liquid distribution apparatus of the present invention with optional features.

FIG. 5 is a sectional view taken along lines 5—5 in FIG. 4.

DETAILED DESCRIPTION OF THE PREFERRED EMBODIMENTS

Figure 1:
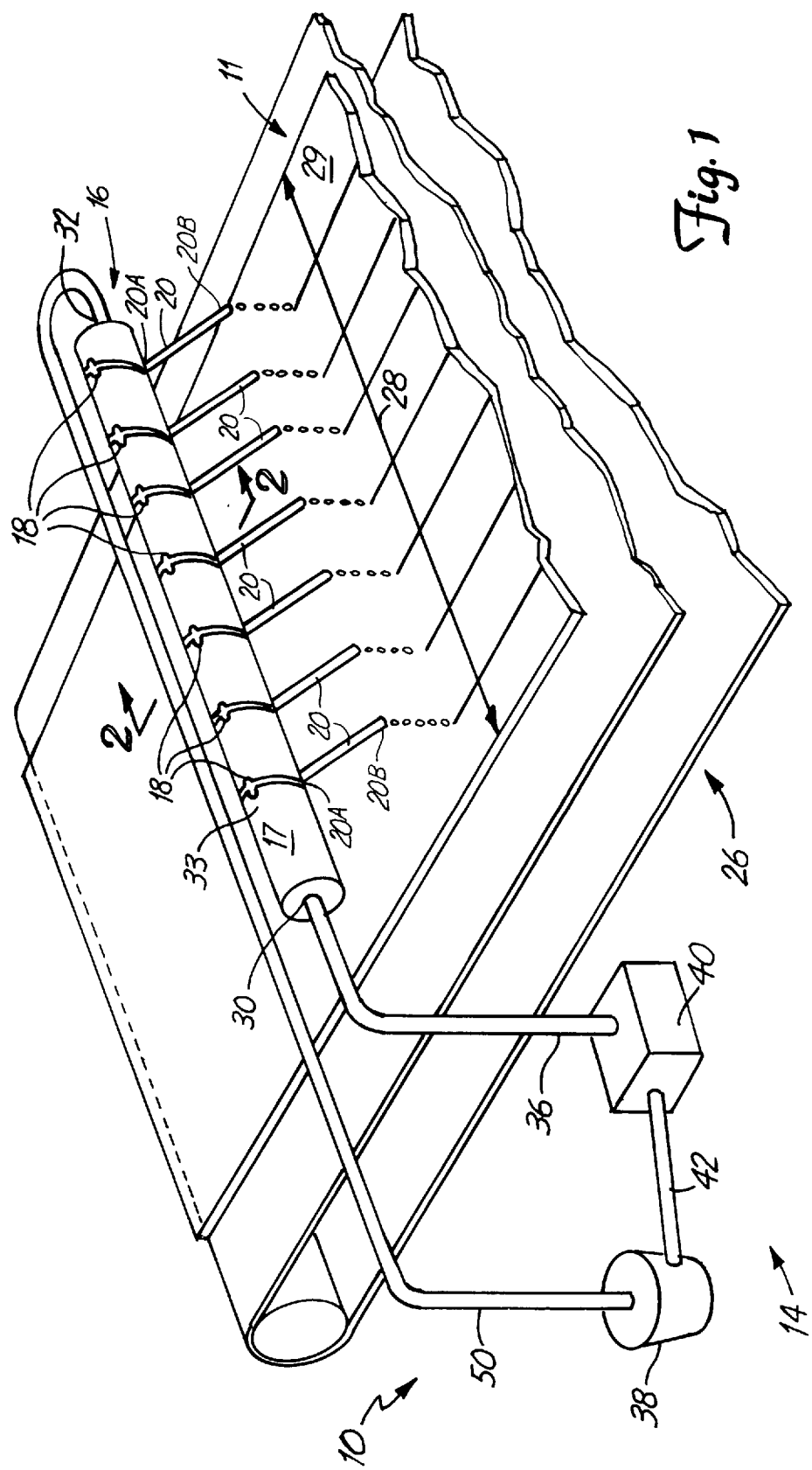
FIG. 1 is a perspective view of a liquid distribution apparatus of the present invention.

A first embodiment of a liquid distribution apparatus of the present invention is illustrated in FIG. 1 at 10. In the embodiment illustrated, the liquid distribution apparatus 10 is mounted above a dough product line to distribute liquid upon a dough product 11. Unlike conventional sprayers known in the art, the liquid distribution apparatus 10 does not spray the liquid onto the dough product 11, but rather, distributes the liquid by dripping it under the force of gravity. The liquid distribution apparatus 10 increases production efficiency of the line since the line does not have to be shut down to clean components that have been covered with a layer of liquid due to spraying.

The liquid distribution apparatus 10 includes a source of liquid 14 and an enclosure 16 fluidly coupled to the source of liquid 14 for receiving the liquid to be distributed. The enclosure 16 includes a plurality of spaced-apart holes 18 through which the liquid exits the enclosure 16. A plurality of guiding elements 20 receive the liquid from the plurality of spaced-apart holes 18 and guide the liquid to the dough product 11. Each guiding element 20 includes a first end 20A disposed proximate the enclosure 16 to receive liquid from one of the plurality of spaced-apart holes 18, and a second end 20B remote from the corresponding first end 20A. The liquid from the spaced-apart holes 18 travels first upon an outer surface 17 of the enclosure 16 and then along the length of each of the guiding elements 20 to drop from the second ends 20B upon the dough product 11. In the embodiment illustrated, the guiding elements 20 comprise a flat strip; however, other suitable guiding elements such as rods or members with channels can also be used. It should be understood that the number of spaced-apart holes 18 in the enclosure 16 can be adjusted as necessary to accommodate any selected width 28. In addition, the guide elements 20 need not extend straight out from the enclosure 16, but can be bent as necessary to distribute oil where desired.

The liquid distribution apparatus 10 is particularly suited for dispensing liquid, such as oil, to dough in a dough processing line. In the embodiment illustrated, the dough product 11 comprises a dough sheet conveyed along a conventional conveyor, a portion of which is illustrated at 26. As discussed in the background section, conventional techniques for applying oil include spraying the dough product 11 with the oil. However, it has been found that applying oil at spaced-apart locations along the width 28 of a top surface 29 of the dough product 11 is sufficient, particularly if the dough product 11 is further processed using folders, rollers and other dough processing equipment, not shown, to distribute the oil on or into the dough as desired.

In the embodiment illustrated, the enclosure 16 comprises a cylindrical tube having an inlet opening 30 and an optional exit opening 32. A pipe 36 couples the inlet opening 30 to the source of liquid 14 comprising a liquid reservoir 38 and a pump 40. The liquid reservoir 38 is coupled to the pump 40 with a supply line 42. As appreciated by those skilled in the art, an elevated reservoir and a suitable control valve can also be used as a source for the liquid.

The pump 40 provides the liquid to the enclosure 16 at low enough pressure such that the liquid does not spray from the spaced-apart holes 18, but rather, is discharged as a liquid stream. Preferably, the spaced-apart holes 18 are disposed on the enclosure 16 upon an upper surface portion 33 so that the flow of liquid from the holes 18 can be quickly stopped, approximately within a second. The maximum pressure of the liquid within the enclosure 16 is approximately 5 psi. Typically, the pressure of the liquid in the enclosure is in a range from approximately 3 psi to 4 psi. The apparatus 10 is particularly well suited to disperse liquids having viscosities in a range from approximately 1 centipoise to 100 centipoise.

Figure 2:
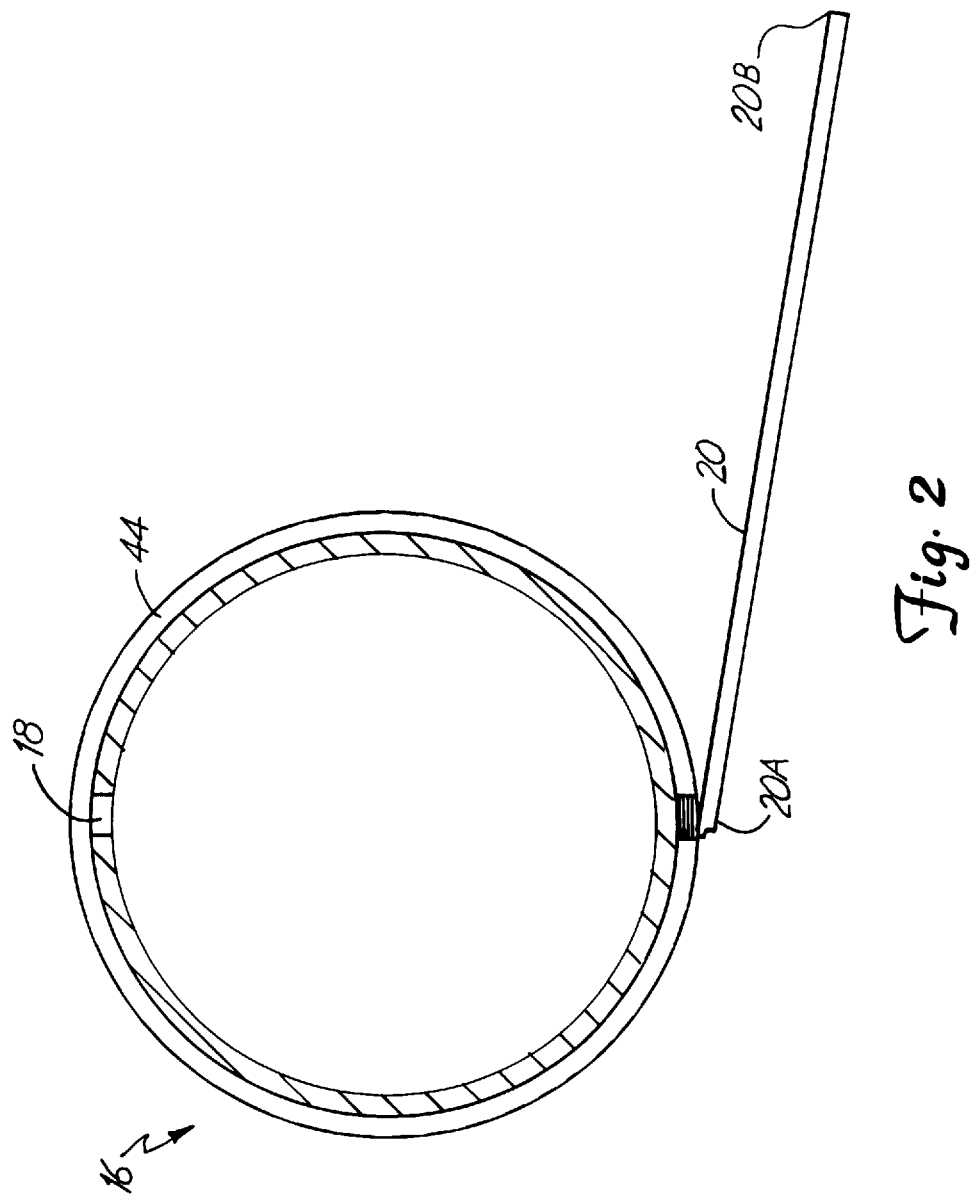
FIG. 2 is a sectional view taken along lines 2—2 in FIG. 1.

Referring also to FIG. 2, liquid exiting each of the spaced-apart holes 18 travels along the outer surface 17 of the enclosure 16 by the force of gravity toward each of the guiding elements 20. Preferably, a guiding structure 44 is provided on the enclosure 16 between each of the spaced-apart holes 18 and corresponding first ends 20A of the guiding elements 20. Each of the guiding structures 44 guides the liquid from the spaced-apart holes 18 to the guiding elements 20. In the embodiment illustrated, each of the guiding structures 44 comprises a groove formed in the outer surface 17. Other suitable guiding structures such as protruding ribs can also be used.

Each of the first ends 20A is secured to the outer surface 17 of the enclosure 16 such as by welding. Since the spaced-apart holes 18 are disposed on the upper most portion of the enclosure 16, liquid can travel along each side of the enclosure 16 to the first end 20A. It should be understood that, if desired, the spaced-apart holes 18, the guiding structures 44 and the guiding elements 20 can be located primarily on one side of the enclosure 16 so that liquid from the spaced-apart holes 18 travels along one side of the enclosure 16.

In one embodiment, the enclosure 16 does not have the exit opening 32, and the pump 40 provides liquid to the enclosure 16 at a rate equal to that exiting the plurality of spaced-apart holes 18. In an alternative embodiment, the pump 40 provides liquid to the enclosure 16 at a rate substantially greater than the liquid exiting the spaced-apart holes 18. The liquid which does not exit the spaced-apart holes 18 is discharged through the exit opening 32 and returns to the liquid reservoir 38 through a pipe 50. In this manner, liquid flow can be accurately controlled in order to obtain the desired flow rate through the spaced-apart holes 18.

It has been found that the sum of the areas of the spaced-apart holes 18 should be substantially less than the cross-sectional area of the enclosure 16 in order to provide approximately equal discharge rates through each of the spaced-apart holes 18. In one embodiment, the sum of the areas of the spaced-apart holes 18 is approximately one-tenth of the cross-sectional area of the enclosure 16.

Figure 3:
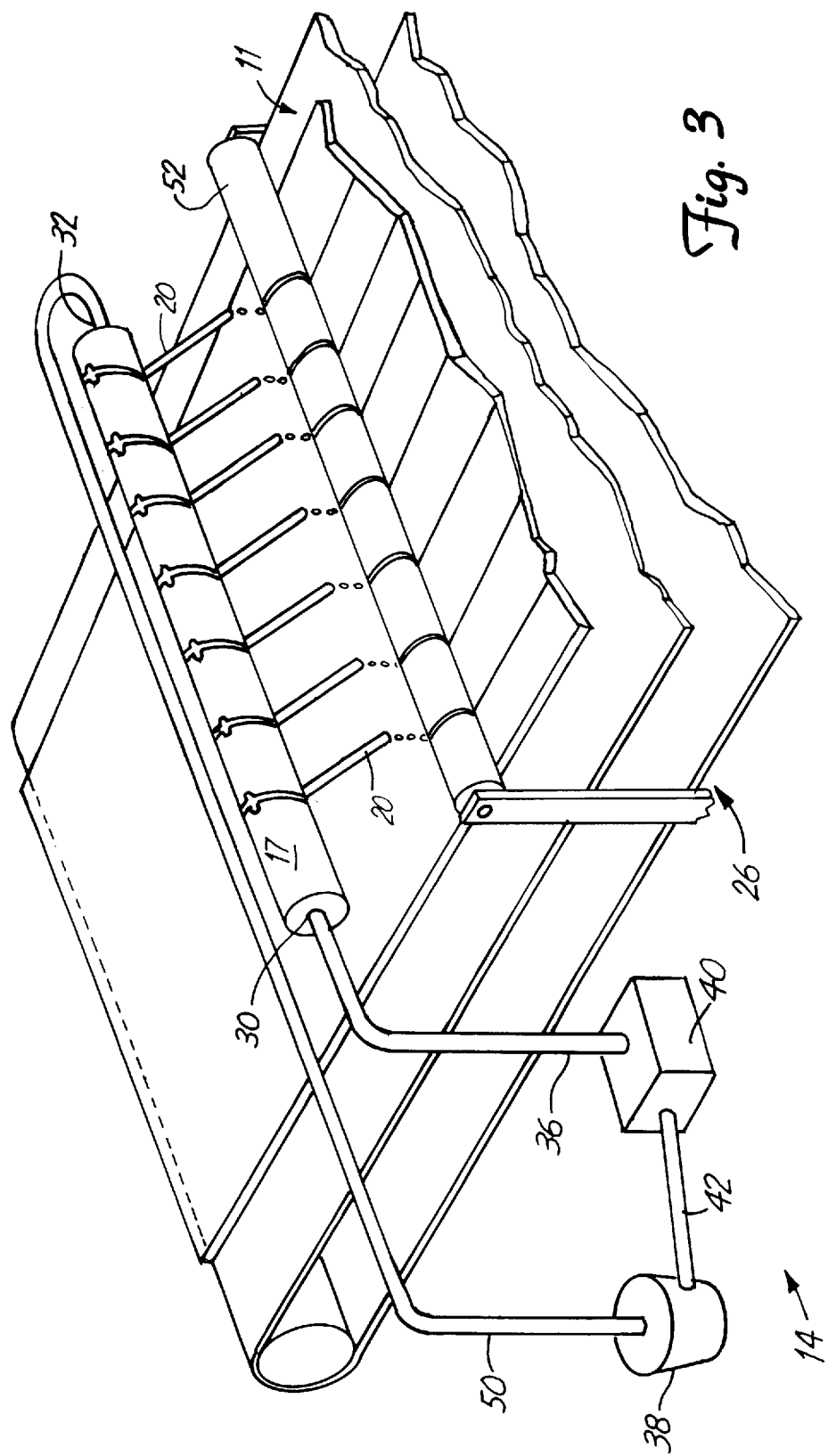
FIG. 3 is a perspective view of a second embodiment of a liquid distribution apparatus of the present invention.

FIG. 3 illustrates a second embodiment of the liquid distribution apparatus 10 wherein an applicator 52 receives the liquid from the guiding elements 20 and applies the liquid to the dough product 11. Exemplified herein as a smooth roller, either driven or free turning, as illustrated, the applicator 52 distributes the liquid from each of the guiding elements 20 over wider portions of the width 28 of the dough product 11. Use of the applicator 52 may be preferred when liquid is being applied to individual dough pieces since the width 28 of the dispensed liquid can be greater due to pressure of the applicator 52 rolling on the dough pieces.

In a further embodiment, the liquid distribution apparatus 10 can be positioned over the conveyor 26 to distribute liquid, for example oil, directly upon a surface of the conveyor 26 prior to placing the dough product 11 on the conveyor 26. By distributing the oil exactly where it is needed, clean up problems associated with excess oil are minimized.

In yet a further embodiment illustrated in FIGS. 4 and 5, the distribution apparatus 10 can include the enclosure 16 with the spaced-apart holes 18, but without the guiding elements 20. Liquid discharged from the holes 18 under a low enough pressure so that it does not spray would travel along the outer surface 17 of the enclosure 16 by the force of gravity toward a lowermost surface portion 58 and then drop upon the dough product 11 when a sufficient amount had collected. In order that the enclosure 16 need not be balanced perfectly, the guide structures 44 can be provided in the outer surface 17 to guide the discharged liquid to the lowermost surface portion 58 and/or protrusions 60 or other suitable liquid collecting structures can be provided on the lowermost surface portion 58 for the liquid to collect.

Although the present invention has been described with reference to preferred embodiments, workers skilled in the art will recognize that changes may be made in form and detail without departing from the spirit and scope of the invention.

What is claimed is:

1. A liquid distribution apparatus for distributing liquid to a food product, the liquid distribution apparatus comprising:
   a source of liquid;
   an enclosure fluidly coupled to the source of liquid for receiving liquid and having a plurality of spaced-apart holes provided in an upper portion of the enclosure through which liquid exits the enclosure; and
   a plurality of guide elements for receiving liquid from the plurality of spaced-apart holes and guiding the liquid to the food product, wherein each guide element includes a first end disposed proximate the enclosure to receive liquid from one of the plurality of spaced-apart holes and a second end remote from the corresponding first end.

2. The liquid distribution apparatus of claim 1 wherein liquid is discharged from each of the plurality of spaced-apart holes due to a pressure of liquid in the enclosure that is greater than atmospheric pressure.

3. The liquid distribution apparatus of claim 2 wherein the first end of each guide element is secured to the enclosure.

4. The liquid distribution apparatus of claim 3 wherein the first end of each guide element is secured to the enclosure remote from each corresponding spaced-apart hole.

5. The liquid distribution apparatus of claim 4 wherein an outer surface portion of the enclosure between each spaced-apart hole and corresponding first end guides the liquid from the spaced-apart hole to the first end.

6. The liquid distribution apparatus of claim 5 wherein each outer surface portion includes a liquid guide structure.

7. The liquid distribution apparatus of claim 5 wherein the plurality of spaced-apart holes are directed upwardly against gravity.

8. The liquid distribution apparatus of claim 1 and further comprising a supply line connected to the liquid source and the enclosure for providing liquid to the enclosure, a return line connected to the enclosure and the liquid source for providing at least some of the liquid back to the liquid source.

9. The liquid distribution apparatus of claim 1 wherein a sum of the areas of the plurality of spaced-apart holes is less than a cross-sectional area of the enclosure.

10. The liquid distribution apparatus of claim 1 wherein each guide element comprises at least one of a plate member, a wire member and a channel member.

11. A liquid distribution apparatus for distributing liquid to a food product, the liquid distribution apparatus comprising:
   a source of liquid;

an enclosure fluidly coupled to the source of liquid for receiving liquid and having a plurality of spaced-apart upwardly facing holes through which liquid exits the enclosure, the liquid traveling along an outer surface of the enclosure to a lower surface whereat the liquid drops to the food product under the force of gravity.

12. The liquid distribution apparatus of claim 11 wherein an outer surface portion of the enclosure guides the liquid from the spaced-apart hole to the lower surface.

13. The liquid distribution apparatus of claim 12 wherein each outer surface portion includes a liquid guide structure.

14. The liquid distribution apparatus of claim 11 wherein the enclosure includes a separate liquid guide structure for each spaced-apart hole.

15. The liquid distribution apparatus of claim 11 and further comprising a plurality of guide elements for receiving liquid from the plurality of spaced-apart holes and guiding the liquid to the food product, wherein each guide element includes a first end secured to the enclosure to receive liquid from one of the plurality of spaced-apart holes and a second end remote from the corresponding first end.

* * * * *